United States Patent [19]
Asher

[11] Patent Number: 4,771,531
[45] Date of Patent: Sep. 20, 1988

[54] DEVICE FOR LIFTING VEHICLE WHEELS

[76] Inventor: Rufus Asher, Rte. 4, Box 105, Arjay, Ky. 40902

[21] Appl. No.: 49,265

[22] Filed: May 13, 1987

[51] Int. Cl.⁴ .......................................... B60B 31/06
[52] U.S. Cl. .................................. 29/426.3; 29/273; 254/2 R; 254/93 R; 280/47.37 R; 414/427; 414/428
[58] Field of Search ............... 29/426.3, 273; 414/426, 414/427, 428; 280/47.38 R; 254/2 R, 93 R, 93 VA, 89 H

[56] References Cited
U.S. PATENT DOCUMENTS

| | | | |
|---|---|---|---|
| 2,490,233 | 12/1949 | Schildmeier | 414/427 |
| 3,036,723 | 5/1962 | McCormick et al. | 414/427 |
| 3,145,859 | 8/1964 | Barosko | 414/427 |
| 3,749,265 | 7/1973 | Smith | 414/427 |
| 3,836,027 | 9/1974 | Gardner | 414/427 |
| 3,850,321 | 11/1974 | Virnig | 414/427 |
| 3,951,287 | 4/1976 | Cofer | 414/427 |
| 4,050,597 | 9/1977 | Hawkins | 414/427 |
| 4,571,142 | 2/1986 | Niewald et al. | 414/427 |

Primary Examiner—Timothy V. Eley
Assistant Examiner—Frances Chin
Attorney, Agent, or Firm—Banner, Birch, McKie & Beckett

[57] ABSTRACT

A wheel puller for removing, transporting, and replacing large vehicle wheels and their corresponding brake drums is disclosed. The wheel puller includes a U-shaped metal frame having a central front portion and two arm portions. Upright members are disposed on or near said central portion and a horizontal pivot bar is mounted between the upright members. The pivot bar is vertically translatable on the upright members. A plurality of wheels are mounted on the frame to support and transport the frame. L-shaped wheel lifting arms pivotably mounted on the horizontal pivot bar pivot from a wheel engaging position to a handle position. In the wheel engaging position, the wheel lifting arms reside within the U-shaped frame and are parallel to and extend in the same direction as the arm portions. In the handle position, the wheel lifting arms reside on the side of the central portion opposite the arm portions and extend in a direction opposite to that of the arm portions. A brake drum lifting arm is removably mounted near the center of the pivot bar and may be used to remove the brake drum of a tire using the wheel lifting arms. Jack means for alternately lifting both the wheel lifting arms and the drum lifting arm are mounted on the frame.

18 Claims, 4 Drawing Sheets

_4,771,531_

DEVICE FOR LIFTING VEHICLE WHEELS

TECHNICAL FIELD

The present invention relates to a device for cradling and lifting large vehicle wheels. More particularly, the present invention relates to an improved device for lifting and removing large vehicle wheels from vehicles in combination with a device for removing the brake drum of the wheel to facilitate servicing.

BACKGROUND OF THE INVENTION

Truck tries or wheels, whether tandem or single, and tries used on heavy construction equipment or farm equipment are extremely heavy and difficult to handle. Such tires often weigh hundreds of pounds and present problems and dangers to an operator servicing them. Heavy construction vehicles and most commercial trucks require a regular program of preventive maintenance which includes the periodic removal of the vehicle wheels to inspect and repair brake linings and seals located in the inner rim area of the wheel. In addition, the outer rim area of the wheel must be available for servicing since wheel bearings are accessable from the outer side of the wheel.

A number of wheel dollies are commercially available for lifting large vehicle tires and removing them from a vehicle. However, none of these devices also include a brake drum removing device to enable servicing of the brake linings and seals on the inner rim areas of the wheel. Many tire lifting devices have additional disadvantages. Many require tilting the wheel in order to service it, thereby complicating the structure. Other devices do not securly hold the vehicle wheels on the wheel lifting device.

SUMMARY OF THE INVENTION

It is an object of the present invention to provide a device which includes both wheel lift arms as well as a removable drum lift arm, all being operated by the same hydraulic jack.

It is another object of the invention to provide a relatively inexpensive device for lifting tires wherein the wheel lift arms may be pivoted backward to serve as a pair of handles to facilitate transporting the device.

A wheel lifting device and method for removing, transporting, and replacing large vehicle wheels and their corresponding brake drums according to the present invention includes a U-shaped steel frame having a central front portion and two arm portions. Two upright members are disposed on or near the central portion and have a horizontal pivot bar mounted between them. The pivot bar is vertically translatable on the upright members. Three steel casters for supporting and transporting the frame are disposed underneath the frame. One caster is disposed on each of the arm portions of the U-shaped frame and the remaining caster is disposed on the central front portion of the frame. The caster disposed on the central front portion of the frame is vertically adjustable relative the frame to adjust the height of the central front portion of the frame. L-shaped wheel lifting arms are pivotably mounted on the pivot bar, and pivot from a first wheel engaging position to a second handle position. In the wheel engaging position, the wheel lifting arms reside within the U-shaped frame extending in the same general direction as the arm portions. In the handle position the wheel lifting arms reside on the side of the central portion opposite the arm portions and extend in a direction generally opposite to that of the arm portions. The wheel lifting arms are separated by a distance sufficient to cradle large vehicles tires. A drum lifting arm is removably mounted near the center of the pivot bar. A hydraulic jack is mounted on the central portion of the U-shaped frame and can be used to alternately lift the wheel lifting arms or the drum lifting arm. A chain is mounted on or near the upper portions of the upright members to secure vehicle tires on the device.

Using the wheel lifting device of the present invention, one person can perform bearing and brake service, drum replacement; and grease seal replacements of a large vehicle wheel. Wheels of any large truck and other vehicles can be serviced with this invention. The wheel lifting device weighs approximately 180 pounds and has a lifting capacity of 1500 pounds.

Various additional advantages and features of novelty which characterize the invention are further pointed out in the claims that follow. However, for a better understanding of the invention and its advantages, reference should be made to the accompanying drawings and descriptive matter which illustrate and describe a preferred embodiments of the invention.

DETAILED DESCRIPTION OF PREFERRED EMBODIMENTS

Figure 1:
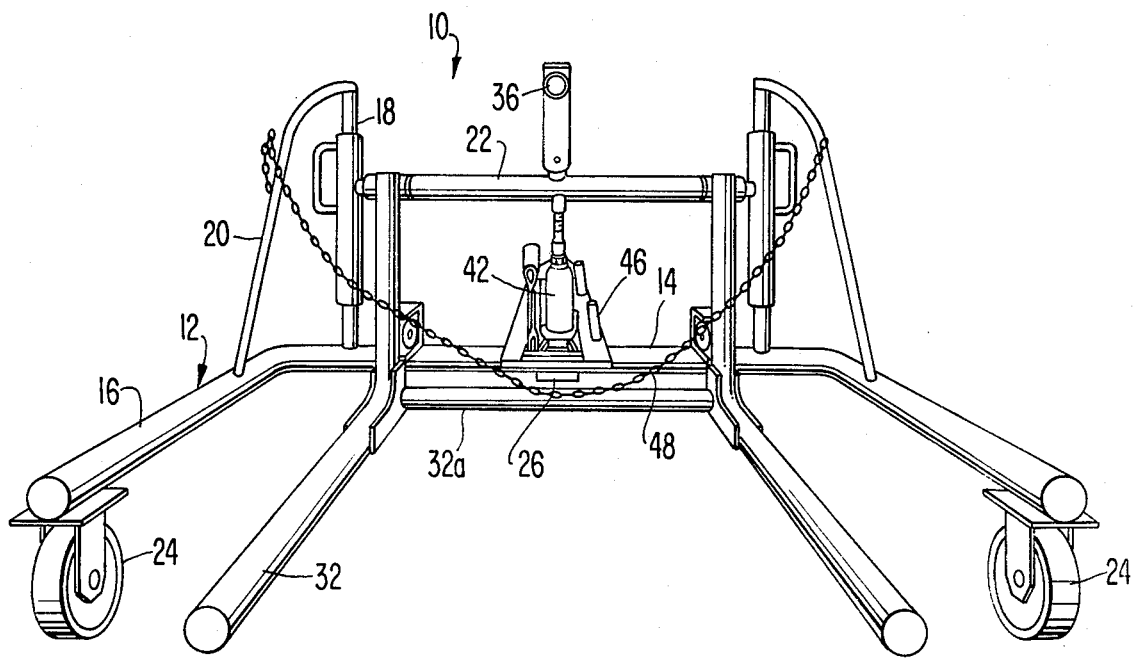
FIG. 1 is a perspective view of the wheel lifting device according to the present invention.
Figure 2:
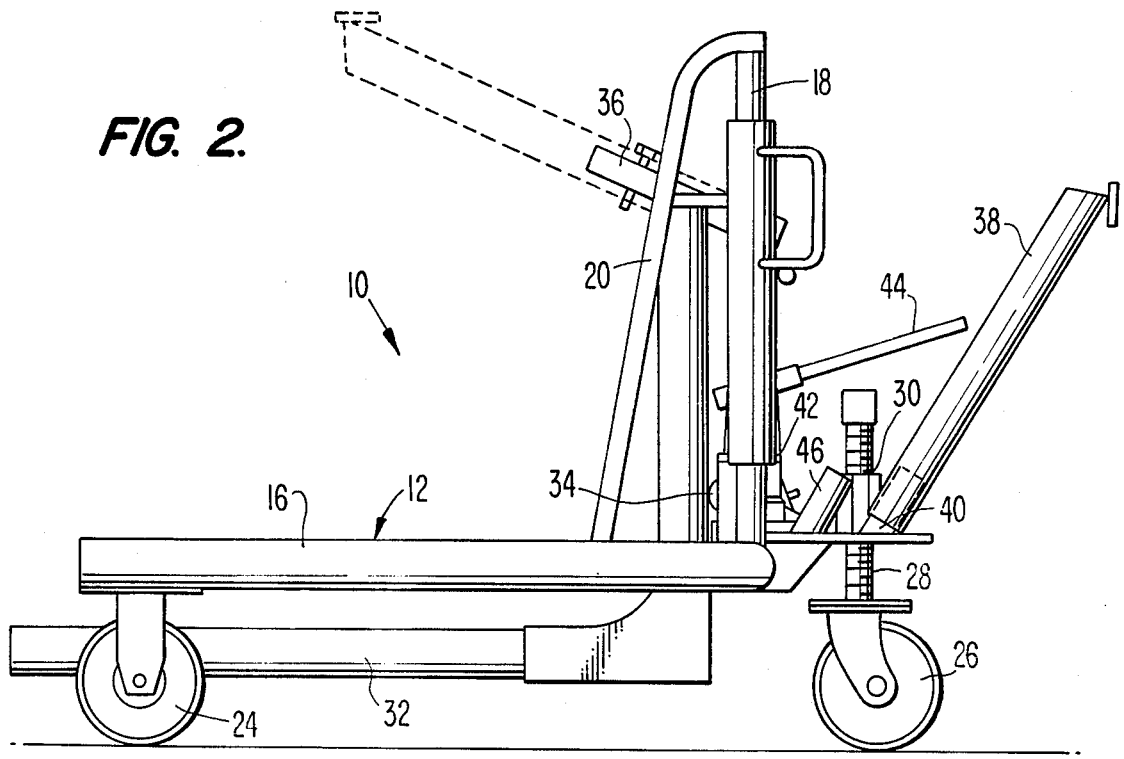
FIG. 2 is a side view of the wheel lifting device configured to be used as a wheel remover.
Figure 3:
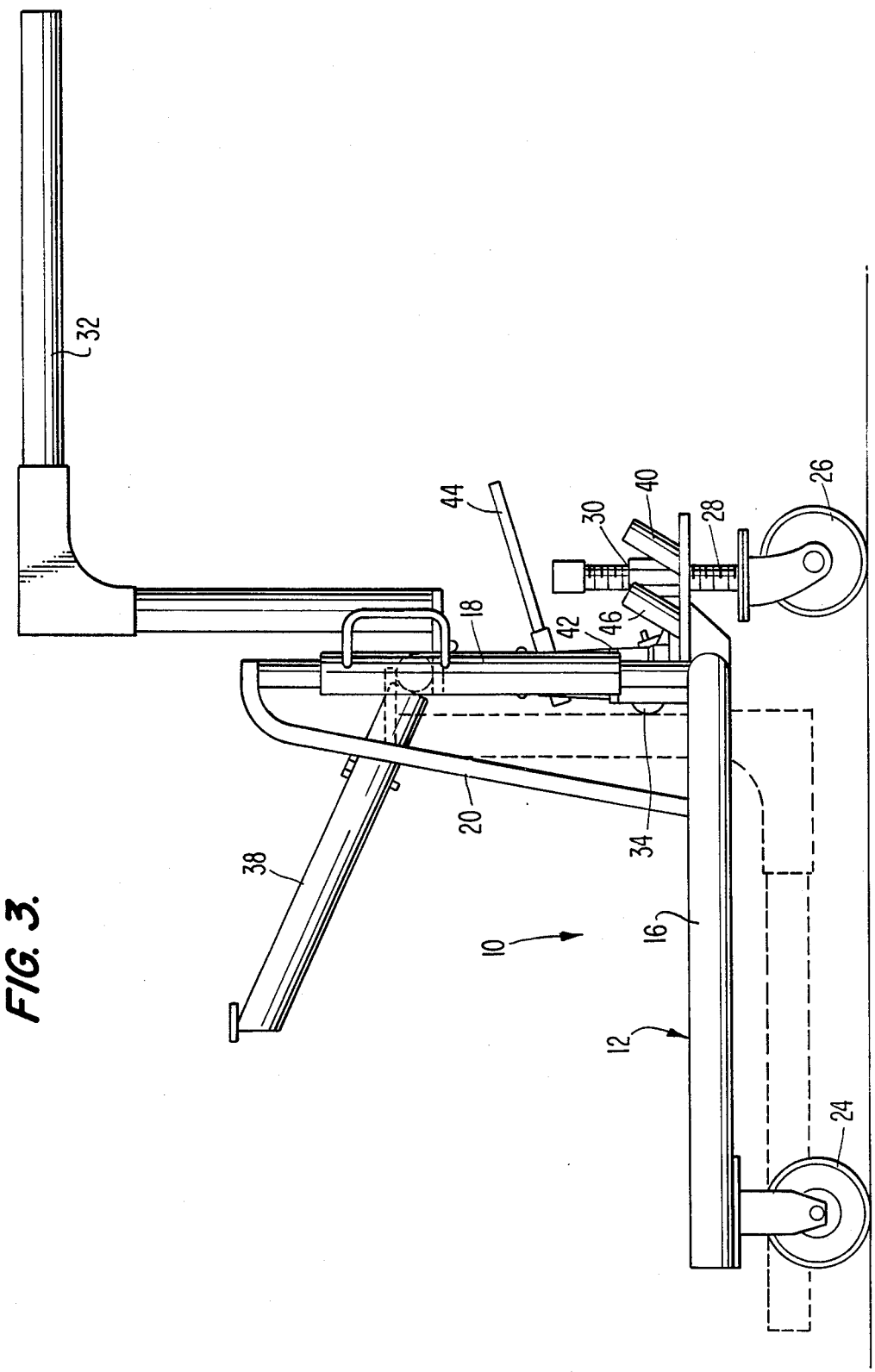
FIG. 3 is a side elevation of the wheel lifting device configured to be used as a drum remover.

Wheel puller 10 includes U-shaped metal frame 12 made from a welded steel tubular frame. Preferably the steel is 1½ inch double-strength steel. U-shaped metal frame 12 includes central front portion 14 and two arm portions 16. Two upright members 18 are vertically disposed on central front portion 14 near arm portions 16. Alternatively, upright members 18 could be disposed on arm portions 16 near central front portion 14. Preferably upright members 18 are formed of 1⅛ inch solid steel. Braces 20 formed of ⅝ inch solid steel may be mounted between arm portions 16 and upright members 18 to provide additional support for upright members 18. Horizontal pivot bar 22 is disposed between upright members 18 and is vertically translatable between upright members 18.

To facilitate transporting wheel puller 10 wheels are mounted beneath U-shaped metal frame 12. Arm wheel 24 is mounted near the end of each arm portion 16 opposite central front portion 14. Preferably arm wheels 24 are 5 inch steel casters having a top plate welded to arm portion 16. Central wheel 26, also a 5 inch steel caster, is adjustably mounted at the center of central front portion 14. Central wheel 26 is connected to threaded rod 28 which is disposed within threaded opening 30 of U-shaped metal frame 12. By adjustably mounting central wheel 26 in central front portion 14, wheel lifting arms 32 may be adjusted in a horizontal plane. By adjusting the height of central front portion 14, the truck wheel being removed can be inclined from the vertical to relieve binding between the hub and the axle, or to release tension on the drum mounting bolts when removing or installing brake drums.

L-shaped wheel lifting arms 22, each have a substantially vertical portion and a substantially horizontal portion, are pivotably mounted on horizontal pivot bar 22 by a sleeved connection. Support bar 32a may be mounted between the two L-shaped wheel lifting arms 32 to provide additional strength and stability. L-shaped wheel lifting arms 32 ride against steel rollers 34 mounted on U-shaped metal frame 12 to prevent binding. L-shaped wheel lifting arms 32 are separated by a distance sufficient to cradle large vehicle wheels. In their working position, L-shaped wheel lifting arms 32 reside within U-shaped metal frame 12 and their horizontal portion extends in generally the same direction as arm portions 16. L-shaped wheel lifting arms 32 may be rotated about horizontal pivot bar 32 into a handle portion and used as handles to facilitate transporting wheel puller 10. When so rotated, L-shaped wheel lifting arms 32 will not interfere with drum lifting arm 36 which may then be used to remove the brake drum of a vehicle wheel. Drum lifting bar 38 is placed on drum lifting arm 36 when wheel puller 10 is used to remove a brake drum. When not in use, drum lifting bar 38 may be stored on drum lifting bar storage peg 40.

Drum lifting arm 36 is activated by hydraulic jack 42 which has a 2 ton capacity. Jack handle 44 of hydraulic jack 42 may be placed on jack handle storage peg 46 when not in use. To prevent tires from falling off wheel puller 10 during transportation or servicing, safety chain 48 wraps around the tires.

L-shaped wheel lifting arms 32 may also be used to lift a truck leaf spring assembly. The wheel puller is structurally adequate to bear the weight of the leaf spring assembly.

Figure 4:
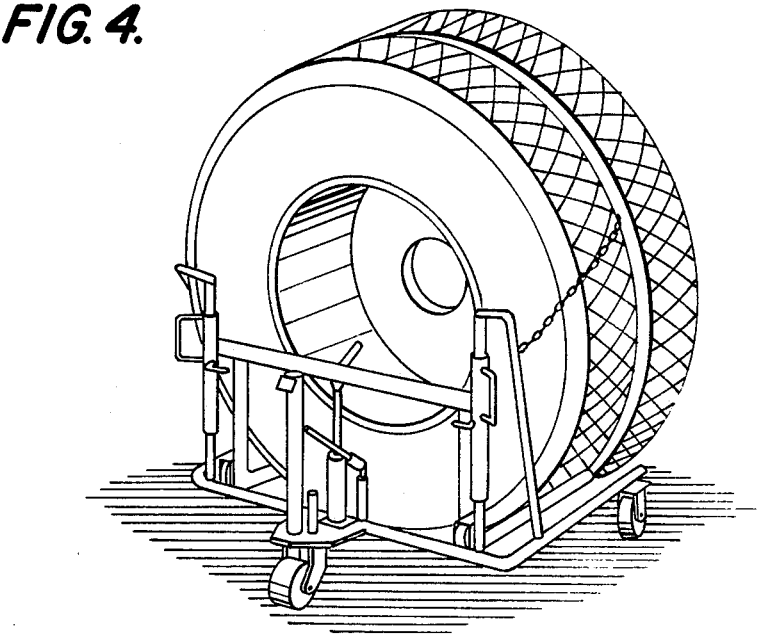
FIG. 4 shows the wheel lifting device supporting two tires.
Figure 5:
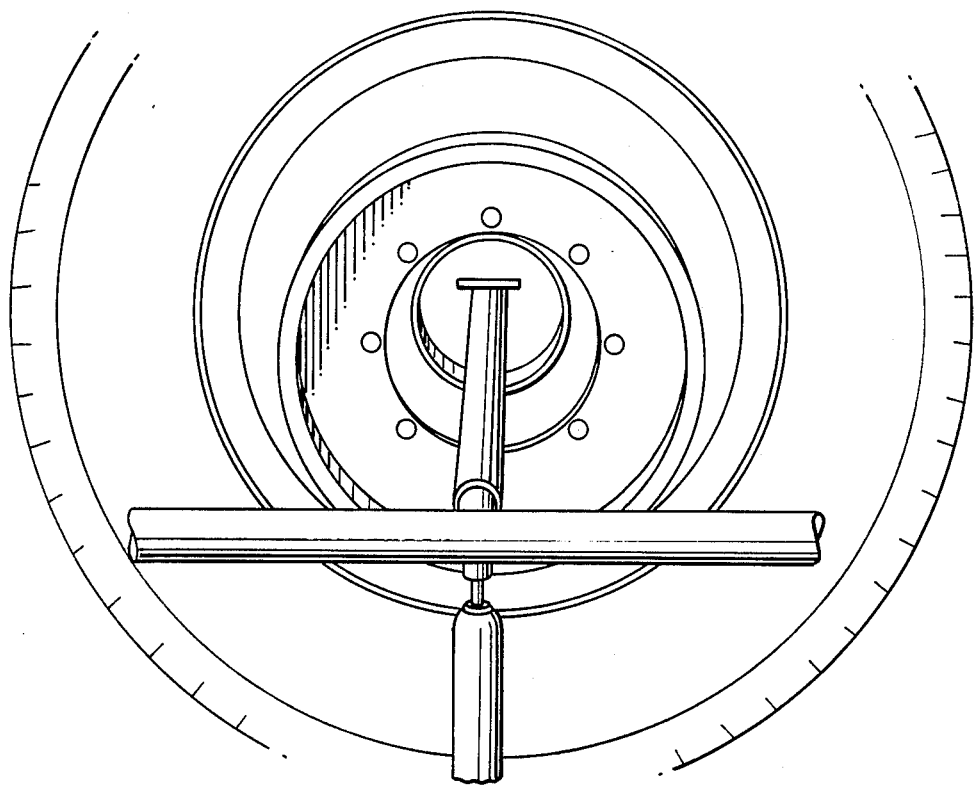
FIG. 5 shows the wheel lifting device during removal of a brake drum.
Figure 6:
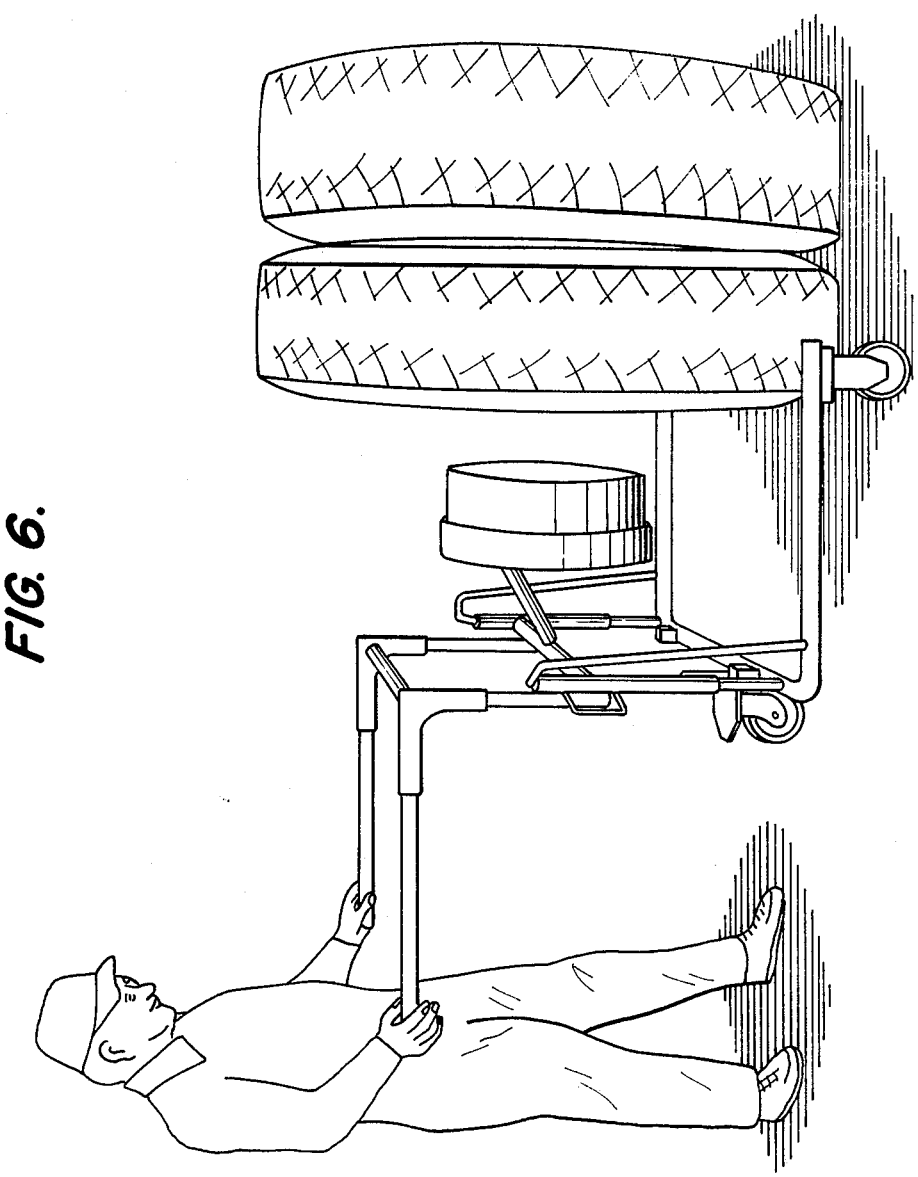
FIG. 6 shows the wheel lifting device after removal of a brake drum.

In operation, a truck is raised until its tire is free from the ground. Then wheel puller 10 is pushed into place so that the truck tire resides between the two L-shaped wheel lifting arms 32. The nut which secures the wheel to the axle is removed and jack handle 44 activates hydraulic jack 42 which lifts L-shaped wheel lifting arms 32 until the tension between the wheel hub and the axle is relieved; hydraulic jack 42 vertically lifts horizontal pivot bar 22 which in turn vertically lifts L-shaped wheel lifting arms 32. Safety chain 48 is wrapped around the wheel to prevent the wheel from falling off L-shaped wheel lifting arms 32. Then wheel puller 10, carrying the wheel, is rolled away from the truck as shown in FIG. 4. The brakes are exposed to be serviced and the wheel can be lowered to the floor and the safety chain 48 removed. With the wheel resting on the floor, wheel puller 10 can be used to remove the brake drum and seals using drum lifting arm 36 and drum lifting bar 38 as shown in FIGS. 5 and 6.

During installation of the brake drum, the drum rests on drum lifting bar 38 and may be adjusted easily to be positioned on the wheel hub. Wheel puller 10 enables one person to perform this operation whereas without wheel puller 10, two people must hold the drum in place while a third person shifts the drum into position.

Numerous characteristics, advantages, and embodiments of the invention have been described in detail in the foregoing description with reference to the accompanying drawings. However, the invention is not limited to the precise illustrated embodiments. Various changes and modifications may be effected therein by one skilled in the art without departing from the scope or spirit of the invention.

I claim:

1. A wheel puller for removing, transporting, and replacing vehicle wheels and their corresponding brake drums comprising:
   a U-shaped frame having a central front portion and two arm portions and having upright members disposed on said central portion and having a horizontal pivot bar mounted between said upright members, said pivot bar being vertically translatable on said upright members;
   a plurality of wheels mounted on said frame to support and transport said frame;
   L-shaped wheel lifting arms pivotably mounted on said horizontal pivot bar, said wheel lifting arms being pivotable from a first wheel engaging position wherein said wheel lifting arms reside within said U-shaped frame extending in generally the same direction as said arm portions to a second handle position wherein said wheel lifting arms reside on the side of said central portion opposite said arm portions and extend in a direction opposite to that of said arm portions, said wheel lifting arms being separated by a distance sufficient to cradle vehicle tires;
   a drum lifting arm removably mounted near the center of said horizontal pivot bar; and
   jack means for lifting said wheel lifting arms and said drum lifting arm.

2. The wheel puller as set forth in claim 1 wherein said jack means alternately lifts said wheel lifting arms and said drum lifting arm.

3. The wheel puller as set forth in claim 1 wherein said jack means comprises a hydraulic jack mounted on said central front portion of said U-shaped frame.

4. The wheel puller as set forth in claim 3 wherein said hydraulic jack comprises a removable jack handle.

5. The wheel puller as set forth in claim 1 wherein said wheel puller is fabricated having a welded steel tubular U-shaped frame.

6. The wheel puller as set forth in claim 1 further comprising retention means for retaining vehicle wheels on said wheel lifting arms.

7. The wheel puller as set forth in claim 6 wherein said retention means comprises a chain.

8. The wheel puller as set forth in claim 1 wherein said plurality of wheels comprise steel casters.

9. The wheel puller as set forth in claim 8 wherein at least one said wheel is disposed on each of said arm portions and at least one said wheel is disposed on said central front portion.

10. The wheel puller as set forth in claim 9 wherein said at least one wheel disposed on said central front portion is vertically adjustable relative said U-shaped frame, permitting adjustment of the height of said central front portion of said U-shaped frame.

11. The wheel puller as set forth in claim 1 wherein said wheel lifting arms serve as handles when located in said second handle position.

12. A welded steel tubular frame wheel puller for removing, transporting, and replacing large vehicle wheels and their corresponding brake drums comprising:
   a U-shaped welded steel tubular frame having a central front portion and two arm portions and having upright members disposed on said central front portion and having a horizontal pivot bar mounted between said upright members, said pivot bar being vertically translatable on said upright members;

three steel casters for supporting and transporting said U-shaped welded steel tubular frame, a first said caster being disposed on said central front portion and the two remaining said casters being disposed one on each of said arm positions, said first caster being vertically adjustable relative said U-shaped welded steel tubular frame, permitting adjustment of the height of said central front portion of said U-shaped welded steel tubular frame;

L-shaped wheel lifting arms pivotably mounted on said horizontal pivot bar, said wheel lifting arms being pivotable from a first wheel engaging position wherein said wheel lifting arms reside within said U-shaped frame extending in generally the same direction as said arm portions to serve as wheel lifters to a second handle position wherein said wheel lifting arms reside on the side of said central front portion opposite said arm portions and extend in a direction opposite to that of said arm portions to serve as handles, said wheel lifting arms being separated by a distance sufficient to cradle large vehicle tires;

a drum lifting arm removably mounted near the center of said horizontal pivot bar;

jack means for lifting both said wheel lifting arms and said drum lifting arm, said jack means comprising a hydraulic jack mounted on said central front portion of said U-shaped welded steel tubular frame and a removable jack handle; and retention means for retaining vehicle wheels on said wheel lifting arms, said retention means comprising a chain.

13. The wheel puller as set forth in claim 12 wherein said jack means alternately lifts said wheel lifting arms and said drum lifting arm.

14. A method of removing, transporting, and replacing vehicle wheels and their corresponding brake drums and wheel hubs to facilitate servicing using a wheel puller comprising a U-shaped frame having a central front portion, a plurality of wheels mounted on said frame at least one of said wheels being mounted on said central front portion, L-shaped wheel lifting arms pivotably mounted on said frame, and being movable between a handle position and a wheel engaging position a drum lifting arm being removably mounted on said frame, jack means for lifting said wheel lifting arms and said drum lifting arm, and retention means for retaining vehicle wheels on said wheel lifting arms, comprising the steps of:

rolling said wheel puller adjacent a wheel to be removed using said L-shaped wheel lifting arms in a handle position;

pivoting said L-shaped wheel lifting arms into a wheel engaging position;

raising the vehicle so that the wheel is above the ground;

rolling said wheel puller into position under the wheel;

securing the wheel on said L-shaped wheel lifting arms by said retention means;

operating said jack means to lift said L-shaped wheel lifting arms to lift the wheel until tension between the wheel hub and the axle is relieved;

rolling said wheel puller away from the vehicle to remove the wheel from the vehicle;

removing the wheel from said wheel puller;

mounting said drum engaging arm on said jack means;

pivoting said L-shaped wheel lifting arms into said handle position;

rolling said wheel puller into position adjacent the wheel;

adjusting the height of said central front portion of said wheel puller to position said drum lifting arm within the brake drum; and operating said jack means to lift said drum lifting arm to engage the brake drum and remove the brake drum from the wheel.

15. The method as set forth in claim 14 further comprising the steps of:

servicing the wheel and the drum;

positioning the brake drum on said drum lifting arm and adjusting the position of the brake drum to precisely align mounting holes in the brake drum and the wheel hub to facilitate replacement of the brake drum;

remounting the brake drum in the wheel;

removing said brake drum lifting arm;

rolling said wheel puller in position adjacent the wheel;

pivoting said L-shaped wheel lifting arms from said handle position to said wheel engaging position;

securing the wheel on said wheel puller by said retention means;

operating said jack means to lift said L-shaped wheel lifting arms to lift the wheel;

rolling said wheel puller into position adjacent the vehicle;

remounting the wheel on the vehicle;

rolling said wheel puller away from the vehicle.

16. The method as set forth in claim 15 wherein said at least one wheel mounted on said central front portion vertically adjusts relative said U-shaped frame to adjust the height of said central front portion of said U-shaped frame.

17. The method as set forth in claim 15 wherein said jack means comprises a hydraulic jack mounted on said central front portion of said U-shaped frame.

18. The method as set forth in claim 15 wherein said retention means comprises a chain.

* * * * *